Oct. 23, 1934.  E. BANDOLY  1,977,711
THERMOMETER
Filed May 5, 1933
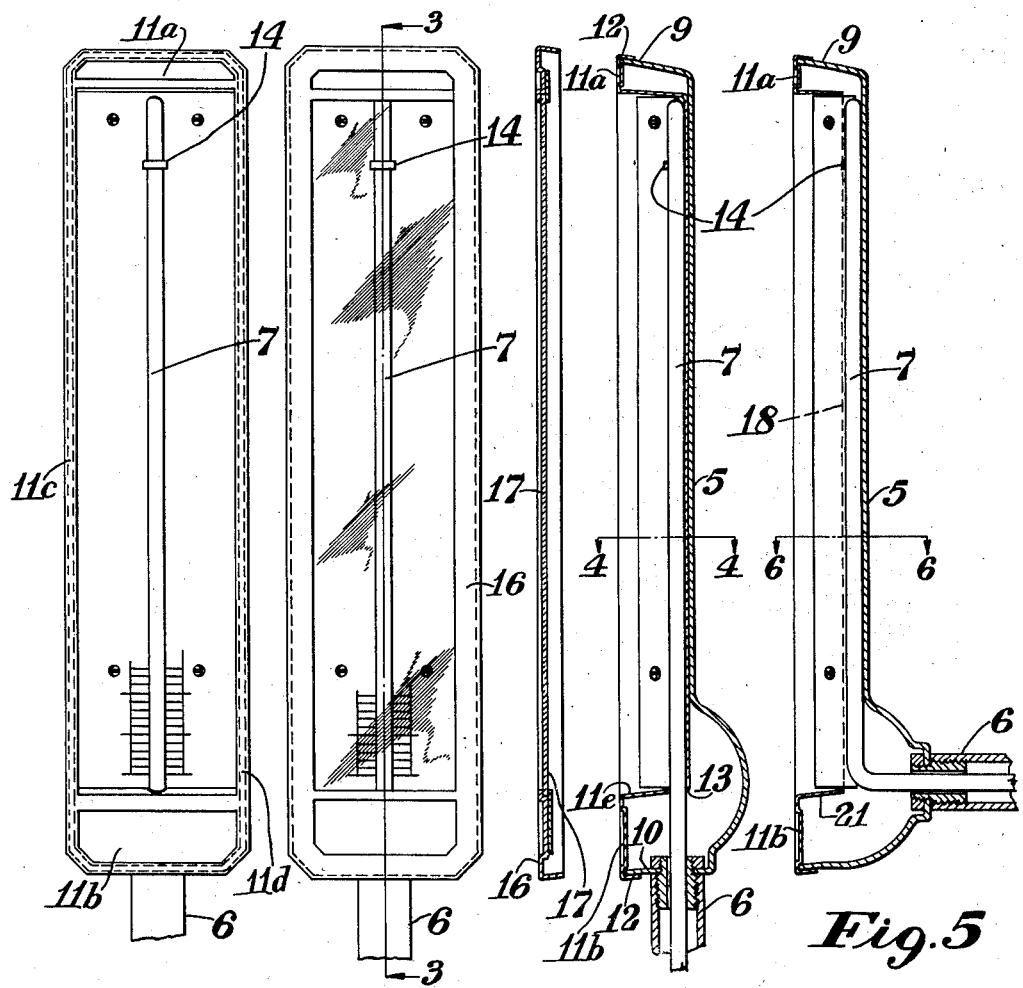
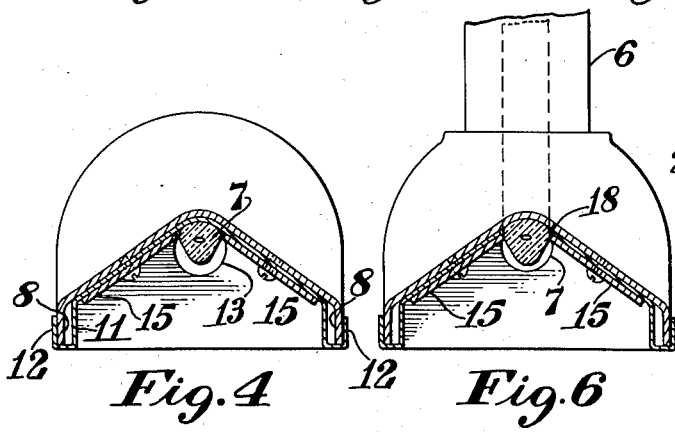
INVENTOR
Erich Bandoly
BY
D. Clyde Jones
ATTORNEY Patented Oct. 23, 1934

1,977,711

UNITED STATES PATENT OFFICE 1,977,711

THERMOMETER

Erich Bandoly, Rochester, N. Y., assignor to Taylor Instrument Companies, Rochester, N. Y., a corporation of New York Application May 5, 1933, Serial No. 669,549

8 Claims. (Cl. 73—52)

This invention relates to thermometers.

Although it is common practice to manufacture industrial thermometers with a protecting front, in many cases the user removes this front during use. However, in industrial thermometers of the type disclosed in my copending application Serial No. 611,143, filed May 13, 1932, where the case is cast or is punched from sheet material, if the protecting front is removed from the case the thermometer presents an unfinished appearance, and in addition the case affords recesses for the collection of objectionable dust and moisture.

In accordance with the present invention, a novel construction is provided whereby the thermometer may be used either with or without the usual thermometer front and the thermometer will still present a finished appearance and will be internally protected.

For a clearer understanding of the invention reference is made to the drawing in which Fig. 1 is a front view of the upper portion of an industrial thermometer with the front thereof removed; Fig. 2 is a similar front view of the upper portion of an industrial thermometer with the thermometer front mounted on the case; Fig. 3 is a vertical sectional view taken substantially on the line 3—3 of Fig. 2 with the thermometer front illustrated in spaced relation to the case; Fig. 4 is a cross sectional view taken substantially on the line 4—4 of Fig. 3; Fig. 5 is a vertical cross sectional view similar to that shown in Fig. 3 except that the thermometer front has not been repeated and the interior of the thermometer case has been modified to adapt it for use in an angle type thermometer; Fig. 6 is a cross sectional view taken substantially on the line 6—6 of Fig. 5; and Fig. 7 is a fragmentary cross sectional view of a thermometer case showing a modified form of liner.

In the drawing, 5 designates a thermometer case which may be punched from sheet material or cast from any material, preferably metal. At the lower end of the thermometer case there is attached in any preferred manner, a protecting stem 6 which surrounds the glass tube 7 of the thermometer. In the case of the straight stem thermometer shown in Figs. 1 to 4, the stem 6 is fastened to the lower end of the case in any well-known manner, whereas in the case of the angle type thermometer illustrated in Figs. 5 and 6, this stem is joined to the case at an angle thereto. The case 5 is generally trough-shaped and is provided with forwardly extending vertical edges 8 and the diverging upper and lower horizontal edges 9 and 10, as is more fully disclosed in the mentioned copending application. As best shown in Figs. 3 and 4, the case 5 is provided with a liner 11 of sheet material closely conforming to the shape of the interior of the case but being spaced from the edges of the case to provide an upper panel 11a, a lower panel 11b and borders 11c and 11d, connecting these panels. The edges of these panels and borders are bent over to form angular flanges 12 to engage the margins of the case adjacent the edges thereof. The liner near its lower end is formed with an inclined portion 11e provided with a hole 13 through which a straight thermometer tube 7 is inserted into the case and liner while the upper end of the thermometer tube is held in position by clasp 14. Graduated scale plates 15 are fastened in the case adjacent each side of the thermometer tube, and liner 11 is also fastened in the case by suitable screws passing through the plates, the liner and the case.

A removable front for the case includes a metal frame 16 in which there is mounted a transparent strip 17 of glass or other suitable material. It should be noted that this frame has marginal flanges which are shaped to conform to the contour of the liner flanges and may be fastened thereon in any suitable manner. However, it is preferred to make the frame of the construction shown in the mentioned copending application so that the front may be applied to and removed from the thermometer case without the use of screws.

In the modified form of the invention shown in Figs. 5 and 6 (which form is particularly adapted for use in connection with the angle type of thermometer), the lining member 21 is substantially the same as that shown in the foregoing figures but differs therefrom in that a slot 18, substantially coextensive with the length of the case, is provided so that the angular thermometer tube 7 may be mounted in the case 5 and thereafter the liner may be inserted in the case by positioning the thermometer tube in the slot in the liner. In this instance also the graduated scale plates are mounted adjacent the thermometer tube and are fastened to the case by suitable screws which also serve to hold the liner in position.

While the margins of the liner 11 have been shown as folded over the edges of the case 5, it will be understood that these margins may be formed as indicated at 22 in the detail view of Fig. 7, so that the liner lies entirely within the case.

By the foregoing construction it is possible to have a thermometer with or without a thermometer front and yet the thermometer has a finished appearance and affords adequate protection for the interior of the thermometer.

I claim:

1. In combination, a trough-shaped thermometer case, a liner closely conforming to the shape of the interior of said case, said liner having a border contiguous to the edges of said case, a graduated scale plate in engagement with the front surface of said liner, and a thermometer tube mounted within the case and liner adjacent said scale plate.

2. In combination, a trough-shaped thermometer case, a liner closely conforming to the shape of the interior of said case, said liner having a border contiguous to the edges of said case, a graduated scale plate in engagement with the front surface of said liner, a thermometer tube mounted within the case and liner adjacent said scale plate, and a thermometer front provided with a window and having flanges engaging the edges of said liner.

3. In combination, a trough-shaped thermometer case, a liner closely conforming to the shape of the interior of the case and having an opening therein near its lower end, said liner having a border contiguous to the edges of said case, a graduated scale plate in engagement with the front surface of said liner, and a thermometer tube passing through said opening and mounted within said case and liner adjacent said scale plate.

4. In combination, a trough-shaped thermometer case, a liner closely conforming to the shape of the interior of said case, said liner having a longitudinal slot therein and also having a border engaging the edges of said case, a thermometer mounted in said slot within said case, and a scale plate mounted adjacent said tube.

5. In combination, a trough-shaped thermometer case, a liner closely conforming to the shape of the interior of said case, said liner having a flat border lying substantially in the plane of the front edge of said case, and a thermometer tube mounted within the case and the liner.

6. In combination, a trough-shaped thermometer case, a liner closely conforming to the shape of the interior of said case, said liner having a flat border lying substantially in the plane of the front edge of said case, a thermometer tube mounted within the case and the line, and a thermometer front provided with a window surrounded by a border having a portion thereof superimposed over the border of said liner.

7. In combination, a trough-shaped thermometer case, a liner closely conforming to the shape of the interior of said case and having a portion thereof wrapped around certain of the edges of said case, and a thermometer tube mounted within the case and liner.

8. In combination, a trough-shaped thermometer case, a liner closely conforming to the shape of the interior of said case and having a portion thereof wrapped around the edges of said case to provide a border, a thermometer tube mounted within the case and the liner, and a thermometer front provided with a window and having a border superimposed over a portion of the border of said liner.

ERICH BANDOLY.